United States Patent [19]
Wilkens

[11] Patent Number: 5,664,663
[45] Date of Patent: Sep. 9, 1997

[54] RECIPROCATING FLOOR CONVEYOR

[76] Inventor: Arthur L. Wilkens, 312 N. Walnut, Stockton, Kans. 67669

[21] Appl. No.: 672,368

[22] Filed: Jun. 25, 1996

[51] Int. Cl.⁶ .................................................. B65G 25/00
[52] U.S. Cl. .................................. 198/750.2; 198/750.5; 414/525.1
[58] Field of Search ............................ 198/750.1, 750.2, 198/750.3, 750.4, 750.5, 750.6, 750.7, 750.8; 414/525.1

[56] References Cited

U.S. PATENT DOCUMENTS

| | | | |
|---|---|---|---|
| 5,094,341 | 3/1992 | McGrath | 198/750.1 |
| 5,156,259 | 10/1992 | Quaeck | 198/750.2 |
| 5,171,122 | 12/1992 | Pellegrino | 198/750.1 X |

*Primary Examiner*—James R. Bidwell
*Attorney, Agent, or Firm*—Reising, Ethington, Barnard & Perry

[57] ABSTRACT

The reciprocating floor conveyor (11) includes a plurality of elongated floor slats (52) that are slidable supported on bearings (50) and constitute a substantial portion of the floor 46 of a cargo container (10). Drive bars (60, 62 and 64) are reciprocated back and forth by a drive and control system to move cargo supported by the floor slats (52). Wedges (68) are attached to the upper surfaces of the floor slats (52) where required to improve conveying. Each wedge (68) has a generally vertical pushing surface (70) with a height and width. The width of a wedge (68) is about 30% of the width of a floor slat (52). An upwardly facing inclined surface (72) of the wedge (68) has a length that is about four times the height of the pushing surface (70). The wedges (68) can be removed or neutralizing wedges (82) can be added to block action of the wedges.

18 Claims, 3 Drawing Sheets

RECIPROCATING FLOOR CONVEYOR

BACKGROUND OF THE INVENTION

1. Technical Field

This invention relates to reciprocating floor conveyors mounted in vehicle cargo compartments and more particularly to floor conveyors having attachable wedges for use in adverse conveying conditions.

2. Description of the Prior Art

Reciprocating floor conveyors are employed in semi-trailers for unloading cargo and in some cases for loading cargo. A variety of materials make up the cargo transported in these trailers. Bulk materials such as wood chips, vegetables for human consumption, forage for animal feed, garbage and sewage sludge are examples of the materials handled by floor conveyors. These conveyors can also be used in loading as well as unloading articles such as hay bales and cotton bales.

Reciprocating floor conveyors generally have floor slats that are about three inches wide and extend the length of the cargo container. The slats are mounted adjacent each other in side by side parallel relationship so that they constitute substantially the entire floor of the container.

A drive system is provided to reciprocate the floor slats back and forth and convey materials supported by the slats. Commercially successful systems generally have the floor slats divided into three floor slat groups with every third slat in a common group. Each group of floor slats is reciprocated back and forth by a common drive that moves all the floor slats in one group about nine inches in one direction and then the same distance in the opposite direction. All three groups of floor slats are moved together in one direction to convey material they support and then each group is returned to the starting position one group at a time while two groups of floor slats remain stationery. Systems have been tried that have two groups of floor slats as well as systems with four or more groups of floor slats. Floor conveyors, with at least some fixed support panels between some of the floor slats, have also been proposed.

Reciprocating floor conveyors rely upon friction to convey cargo. The cargo containers are provided with smooth walls and the floor slats are extruded members so that the only force tending to convey or hold cargo is friction when the floor is horizontal. The frictional forces exerted on the cargo by moving surfaces have to overcome forces tending to hold the cargo in a fixed position to convey the cargo. The frictional forces exerted on the cargo by fixed surfaces has to be larger than the forces exerted by the floor slats that are being returned for another cargo conveying stroke.

The walls of a cargo container with a reciprocating floor conveyor have smooth inside surfaces with a low coefficient of friction. With some cargo, the inside wall surface exerts little or no force on the cargo. Other bulk cargo tends to settle down and move outward toward the walls and exert an outward force against the inside surfaces of the walls. The outward force of the cargo against the inside surfaces of the walls may result in a substantial force tending to hold cargo in the cargo compartment.

Extruded floor slats have smooth upper surfaces extending along their lengths. Raised projections on their upper surfaces also extend along their entire length. These raised portions have minimal influence on the force transferred from the floor slats to the cargo. Floor slats are extruded from aluminum or plastic material. During the return stroke of a group of floor slats, there is sliding contact between the cargo contacting surface of the floor slats and the cargo. This sliding contact tends to clean the cargo contacting surface and leave a clean polished surface with a low coefficient of friction. The low coefficient of friction reduces the force exerted on the cargo by the slat to either convey cargo or to hold cargo during a return stroke of adjacent floor slats.

Tilting a floor conveyor from horizontal will have substantial effect on the ability of the conveyor to move cargo. If one side of the cargo container is raised, the side wall on the low side will support a larger portion of the cargo weight and the frictional holding force on the cargo will increase. The vertical force exerted by cargo on the floor slats will decrease and the force exerted on the cargo by the floor slats due to friction will decrease. As a result of tilting the cargo container to one side, conveying will slow and may come to a stop.

Raising the discharge end of a reciprocating floor conveyor relative to the opposite end will also slow or even stop the rate at which cargo is conveyed. Such an inclination creates a force component on the cargo that tends to move cargo away from the discharge end of the floor slats. At the same time, the force from the cargo on the floor slats normal to the cargo contact surface of the floor slats is reduced and frictional force exerted by the floor slats on the cargo is decreased. This change in the forces acting upon the cargo will decrease the rate of conveying and can prevent conveying. Such tilting of the floor conveyor can also result in a condition in which one group of floor slats will convey cargo away from the discharge during a return stroke and the two stationery groups of slats will not hold the cargo.

Cargo containers, which may be fifty-five feet long or longer, may have open tops for loading, a cross bar for holding the top of the rear discharge doors and one or more intermediate cross bars. Cargo which is piled up may contact the cross bars and exert a holding force on the cargo. If the conveying force due to friction between the floor slats and the cargo is reduced due to tilting, the additional force exerted upon the cargo by the cross bars may slow or prevent the discharge of cargo.

Floor slats with upper surfaces that include inclined ramps and substantially vertical pushing surfaces are suggested by U.S. Pat. No. 5,156,259 to Quaeck. Quaeck suggested this floor slat surface for use with a floor conveyor that has only two groups of driven floor slats. The floor slats disclosed by Quaeck would be heavy, expensive to manufacture and difficult to install in an existing cargo container. These floor slats would also be difficult and expensive to remove from a conveyor in order to convey cargo in two direction. Some cargo would likely be held in the pockets created between adjacent pushing surfaces. Some cargo may also bridge across one slat and be held by two adjacent floor slats.

Cargo containers with reciprocating floor conveyors are employed to meter bulk material into a processing machine at a uniform rate. Adverse conveying conditions and conveying problems due to material that is difficult to convey may cause uneven conveying rates. Uneven conveying rates can render reciprocating floor conveyors unacceptable for metering bulk material into processing machinery.

SUMMARY OF THE INVENTION

An object of the invention is to provide wedges for reciprocating conveyor floor slats that can be attached to floor slats to improve conveying in difficult conditions. Another object of the invention is to provide floor slat wedges that exert minimal force on cargo when moving away from the cargo discharge. A further object of the invention is to provide floor slat wedges that minimize cargo bridging across a floor slat. A still further object of the invention is to provide floor slat wedges that can be rendered ineffective or removed inexpensively when they are not required.

The reciprocating floor conveyor is mounted in a cargo container. The container has a frame, two side walls attached to the frame, and end wall attached to the frame and the two side walls, and a door frame that defines a discharge opening. Doors are pivotally attached to the door frame and close the discharge opening when they are pivoted to a closed position.

The reciprocating floor conveyor includes a plurality-of narrow elongated floor slats that form substantially the entire floor of the container. Each floor slat extends substantially from the end wall to the discharge opening. The floor slats are supported by bearings attached to the frame. These bearings hold the floor slats in a parallel side by side relationship and permit the floor slats to be moved horizontally toward and away from the discharge opening.

A vehicle cargo container that is 102 inches wide would normally have 26 floor slats. These floor slats are divided into three groups of floor slats with each floor slat between floor slats in the other two groups except for the two floor slats that are adjacent to the side walls.

All of the floor slats in group I are attached to a common first drive bar and are reciprocated-back and forth by a first hydraulic cylinder. The floor slats in group II are attached to a second drive bar and reciprocated back and forth by a second hydraulic cylinder. The floor slats in group III are attached to a third drive bar and reciprocated back and forth by a third hydraulic cylinder. The distance moved in one direction is generally about 9 inches but can be increased or decreased if desired.

During operation all the floor slats are moved together toward the discharge opening carrying the cargo with them. The floor slats are then retracted one group at a time. The two stationary groups of floor slats hold the material being conveyed in a fixed position while the floor slats being retracted slide relative to the material being conveyed. After all three groups of floor slats have been retracted, they are advanced together simultaneously toward the discharge opening taking the cargo with them. This procedure is repeated until the cargo is all discharged from the cargo compartment.

Wedges that convey in one direction only are attached to the upper surfaces of the floor slats as required to improved conveying efficiency and to provide a more uniform discharge rate in difficult conditions. These wedges are useful when the ends of the floor slats adjacent to the discharge opening are higher than the remainder of the floor slats or when the floor slats are tilted to one side. The wedges are also used when the cargo being conveyed is difficult to convey.

The wedges are attached to the floor slats in areas where they are needed. They may for example be used along the side walls only or adjacent to the discharge end of the floor slat or some other area where material slides relative to the floor slats when it should either move with floor slats or must remain stationary with floor slats.

The wedges are made from any suitable material. They can be attached to the floor slats by mechanical fasteners, by adhesives or by welding. They can be attached to the floor slats before the floor slats are installed in a floor conveyor. It is also desirable to be able to attached the wedges to floor slats that are installed in a conveyor. The wedges are removed from the floor slats when they are no longer required or when the conveyor is to convey material in two directions.

The wedges have a substantially vertical transverse pushing surface, an upwardly facing incline surface that slopes downward and away from the upper edge of the pushing surface and triangular side surfaces.

The pushing surface of each wedge is rectangular and has a width that is about 30% of the width of the floor slats to which it is attached. The upwardly facing incline surface has a length that is over three times the height of the pushing surface. The wedges can be removed by removing fasteners, breaking a bond, or breaking a weld. If necessary, the wedges can be removed by grinding or cutting. A wedge made from a composite material and bonded to a plastic slat can be quickly and inexpensively removed by a grinder. Aluminum could also we removed by a grinder.

A reciprocating floor conveyor with one direction wedges can be employed for conveying in a reverse direction by adding additional wedges. The additional wedges are attached to the floor slats with their vertical pushing surface in contact with and facing the vertical pushing on the original wedges. In this position, the additional wedges neutralize the effect of the original wedges.

THE DRAWINGS

The presently preferred embodiments of the invention are disclosed in the following description and in the accompanying drawings, wherein.

DESCRIPTION OF THE PREFERRED EMBODIMENT

Figure 1:
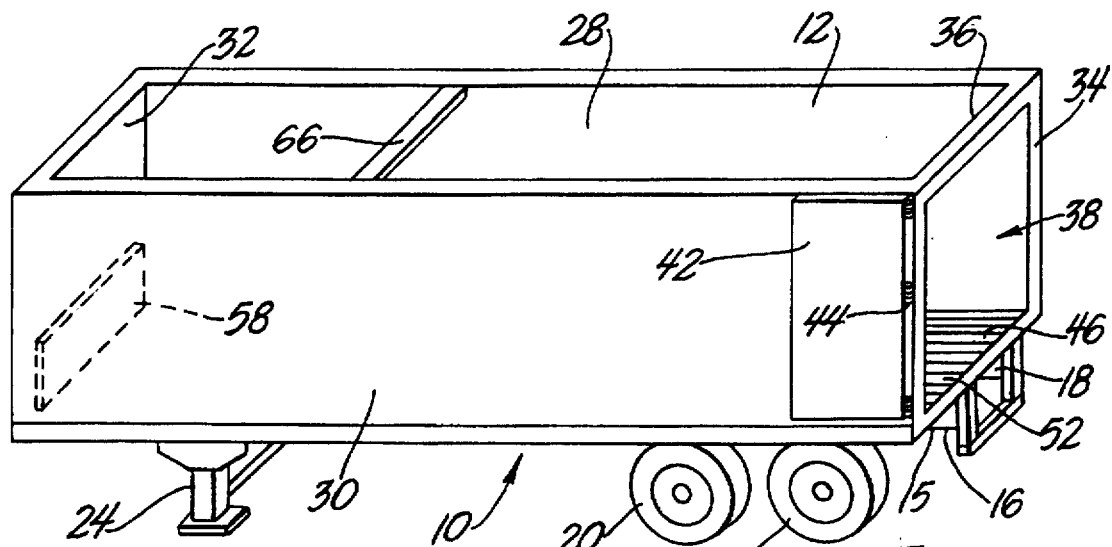
FIG. 1 is a perspective view of a semi-trailer with a reciprocating floor conveyor.
Figure 3:
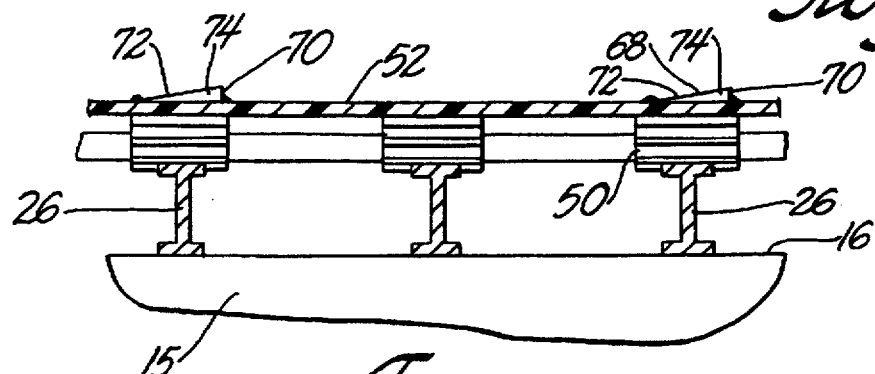
FIG. 3 is an enlarged sectional view of a floor slat and attached floor slat wedges taken along lines 3—3 in FIG. 2.

The cargo container 10 as/shown in the drawing is a portion of a semi-trailer 12. The cargo container 10 could also be a stationary unit, a container mountable on a truck chassis or a container that is transported by another form of transportation.

The reciprocating floor conveyor 11 constitutes substantially the entire floor of the container 10 as shown in the drawing.

The semi-trailer 12 has a frame assembly 15 with frame members 16 and 18 supported by wheels and axle assemblies 20 and 22 and a known suspension system (not shown). The front portion of the frame members 16 and 18 are supported by landing gear 24 as shown in FIG. 1. A hitch pin (not shown), for attached the semi-trailer to a fifth wheel on a tractor is attached to the bottom side of the frame assembly 15 forward of the landing gear 24. When the semi-trailer is connected to the fifth wheel of a tractor, the landing gear 24 is retracted. The frame assembly 15 includes a plurality of transverse I-beams 26.

A right side wall 28 and a left side wall 30 are connected to and supported by the frame assembly 15. A front end wall 32 is connected to the side walls 28 and 30 and to the frame assembly 15. A rear door frame 34 is connected the side walls 28 and 30 and to the frame assembly 15. A cross beam 36 of the door frame 34 extends from the top of one side wall 28 to the top of the other side wall 30. The door frame 34 defines a rear cargo discharge opening 38. The right side door 40 and a left side door 42 are pivotally attached to the door frame 34 by hinges 44. The doors 40 and 42 are pivotal on the hinges 44 between positions in which the cargo discharge opening 38 is closed and positions in which the discharge opening is open.

The floor 46 of the cargo container 10 includes a plurality of parallel guide tube assemblies 48 secured to the transverse I-beams 26 and extending substantially the entire length of the cargo container 10. Bearings 50 are attached to the guide tube assemblies 48. Elongated parallel floor slats 52 are slidably supported on the bearings 50. One floor slat 52 is supported by the bearings 50 on one guide tube assembly 48. In a standard width (96 inches) semi-trailer there are preferably about 24 floor slats 52. These floor slats 52 make sliding contact with adjacent floor slats. The floor slats 52 adjacent to the side walls 28 and 30 make sealing contact with a half floor slat 54 that has been cut along its entire length and secured to the right hand side wall and the half floor slat 56 that has been cut along its entire length and secured to the left side wall. All of the floor slats 52 are slidable back and forth on the bearings 50 except the half floor slats 54 and 56 which are secured by fasteners. Both half floor slats 54 and 56 are laterally adjustable to control the spacing between the floor slats 52. The ends of the floor slats adjacent to the end wall 32 are covered by a slant board 58 to keep cargo from entering the space between the-ends of the floor slats and the end wall.

Figure 2:
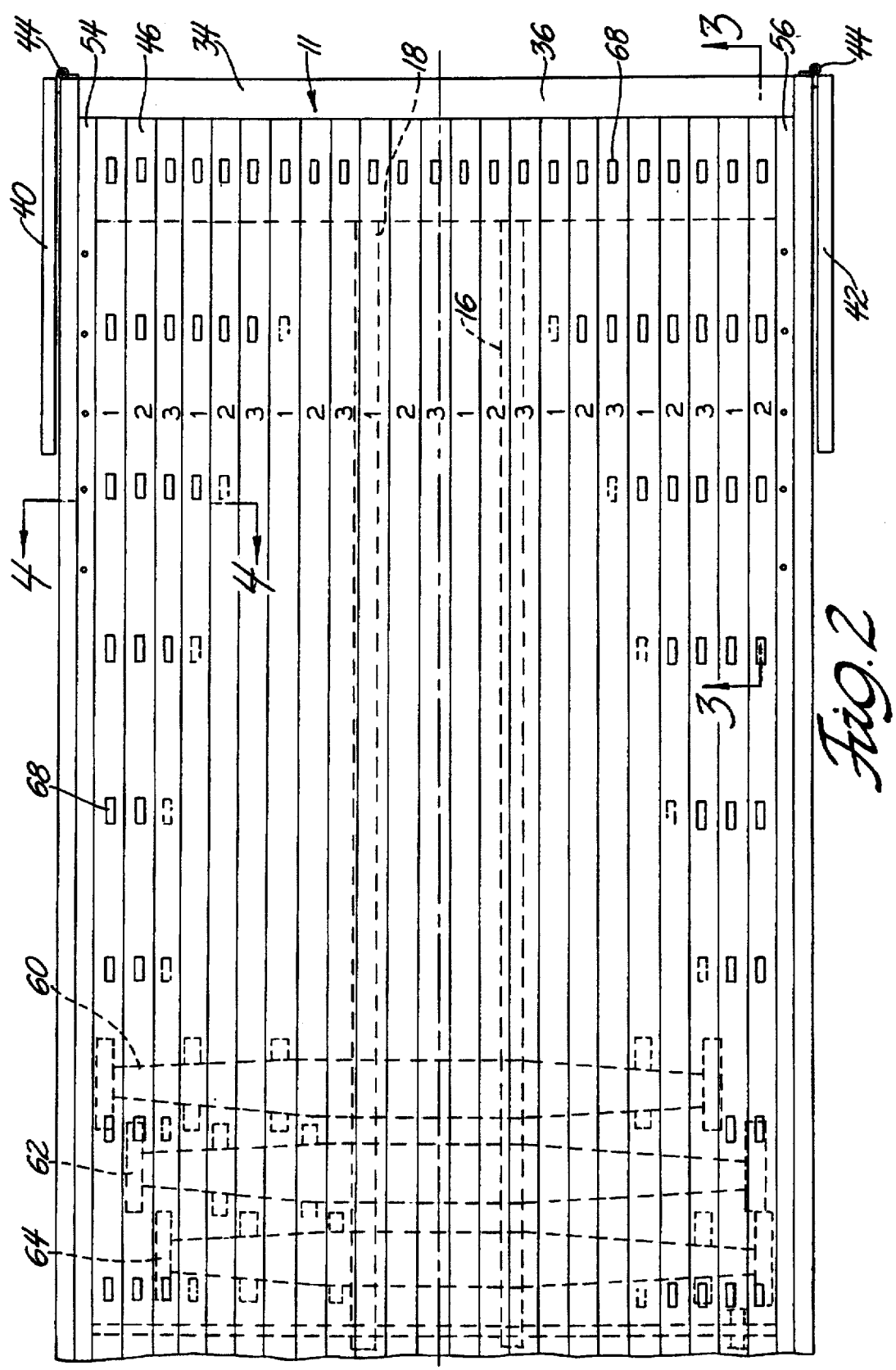
FIG. 2 is an enlarged plan view of a portion of a reciprocating floor conveyor with floor slat wedges.

The floor slats 52 are divided into three groups as shown in FIG. 2. Every third floor slat 52 is in the number 1 group and has a number 2 group floor slat on its left and a number 3 group floor slat on its right. All of the floor slats 52 in the number 1 group are connected to a drive bar 60. All of the floor slats 52 in the number 2 group are connected to a drive bar 62. All of the floor slats in the number 3 group are connected to a drive bar 64. The drive bars 60, 62 and 64 are secured to the bottom of the floor slats 52 in the center portion of the cargo container 10 where each guide tube of a guide tube assembly 48 is discontinued for a few inches. Hydraulic cylinders (not shown) are connected to the drive bars 60, 62, and 64 and reciprocate the drive bars back and forth as disclosed in U.S. Pat. No. 5,301,798 to Wilkens, the disclosure of which is incorporated herein by reference.

To convey cargo to the discharge opening 38, hydraulic fluid is supplied to the hydraulic cylinders to simultaneously drive all three drive bars 60, 62, and 64 and the attached floor slats 52 toward the discharge opening 38. Cargo supported by the floor slats 52 moves to the rear with the floor slats. After all the floor slats 52 move about 9 inches toward the discharge opening 38, they all stop moving. Drive bar 64 is then moved away from the discharge opening 38 together with the number 3 group of floor slats 52 while the drive bars 60 and 62 remain stationary. Cargo supported by the floor slats 52 remain stationary with the floor slats attached to the drive bars 60 and 62. The drive bar 62 is then moved away from the discharge opening 38 while the drive bars 60 and 64 and the attached floor slats 52 remain fixed. The drive bar 60 is then moved away from the discharge opening 38 while the drive bars 62 and 64 and the attached floor slats 52 remain fixed. Upon the drive bar 60 reaching its limit of travel away from the discharge opening 38, all three drive bars 60, 62 and 64 are ready to be moved simultaneously toward the discharge opening 38 and carry cargo with them. The above sequence of movement of floor slat 52 and drive bars 60, 62 and 64 is repeated and continues until all the cargo is discharged. The 9 inch movement can be increased or decreased. However all floor slats move the entire distance each time their driving hydraulic cylinder is activated.

The floor conveyor described above works very well with most cargo when the floor slats 52 are in a substantially horizontal plane. If the floor slats 52 are tilted, then gravity affects conveying and the frictional forces change. Tilting the cargo to one side, for example, will increase the frictional holding force exerted on the cargo by the wall on the low side and may slow the conveying of material. If the ends of the floor slats 52 adjacent to the discharge opening are raised relative to the other end of the floor slats, a gravitational force will tend to move cargo away from the discharge opening. In some cases, two groups of stationary floor slats 52 are not able to hold cargo when one other group of floor slats moves away from the discharge opening 38. This situation can occur when discharging trash, a portion of which is in plastic bags, at a landfill. At landfills, the floor slats 52 frequently slope upward toward the discharge opening 38. The frictional forces between the plastic bags and the floor slats 52 is relatively small making it easier for gravity to hold the trash bags in the cargo compartment or even move the bags away from the discharge opening 38.

Trash in plastic bags may be relatively light weight. To obtain the desired total weight in the cargo container 10, it is necessary to completely fill the container and place some bags on top above the top of the side walls 28 and 30. These plastic bags are retained by a cover during transport to the unloading site. If the trash does not settle sufficiently, bags may contact the cross beam 36 of the rear door frame 34 as well as cross beams 66 between the front end wall 32 and the cross beam 36. Cross beams 66 may be added to reinforce the side walls 28 and 30 or to support a cover for the cargo container 10. The force exerted on the material to be unloaded by the cross beam 36 and by cross beams 66 can in some situations hold cargo and cause the cargo to slide on the floor slats 52 when the floor slats are simultaneously moved toward the discharge opening.

Conveying problems are reduced or eliminated by attaching wedges 68 to the upper surfaces of the floor slats 52 that convey material in one direction. Each wedge 68 has a generally vertical pushing surface 70 that faces toward the discharge opening 38, and upwardly facing incline surface 72, and side surfaces 74 and 76. The width of each wedge 80 is preferably about ⅓ of the width of the floor slat 52 to which it is attached. However, the width could be as little as 20% of the width of the floor slat 52 or as much as 80% of the width of the floor slat. If the wedges 68 are too narrow they may tend to break or cut material rather than convey it. If the wedges 68 are too wide, material may bridge across a floor slat between wedges on adjacent floor slats. The upwardly facing incline surface 72 preferably has a length that is about four times the height of the vertical pushing surface 70. The upwardly facing inclined surface 72, if it is too large, may also tend to lift and hold material rather than sliding relative to the material. The side surfaces 74 and 77 of the wedges 68 can be vertical or inclined as desired. These triangle shaped side surfaces 74 and 76 generally have little influence on conveying. Inclined side surfaces 74 and 76 could make the edge where the side surfaces meet the upwardly facing incline surface 72 less sharp and less likely to damage material being conveyed. The upwardly facing incline surface 72 as shown has a length that is about 5 times the height of the generally vertical pushing surface 70. This incline surface 72 should be at least 3 times the height of the pushing surface 70 so that it will lift and slide under rather than holding or conveying material in the wrong direction. As shown in the drawing, the incline surface 72 intersects the pushing surface 70. If desired the inclined surface 72 could be separated from the pushing surface 70 by a flat horizontal surface or by a curved surface to eliminate a sharp edge. The wedges 68 should be attached the floor slats 52 only where required. A row of wedges 68 across the floor 46 under the cross beams 36 and 66 may be helpful and a few scattered wedges along the side walls 28 and 30 may be all that is required. One possible pattern is shown in FIG. 2.

Figure 4:
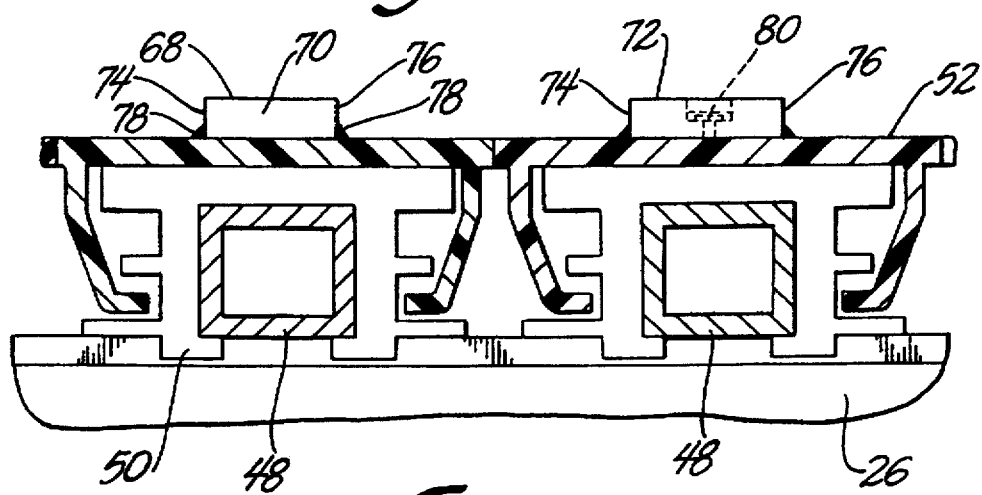
FIG. 4 is an enlarged sectional view taken along line 4—4 in FIG. 2.

The wedges 68 may be welded to the floor slats 52 as shown at 78, attached by an adhesive, or secured by mechanical fasteners 80 as shown in FIG. 4. The attaching system used depends upon the materials used to form the floor slats and the expected employment of the floor conveyor. If the floor slats 52 are extruded from a plastic material, and adhesive which bonds a plastic wedge 62 to the plastic floor slat would be an acceptable attaching system. Aluminum wedges 62 can be quickly secured to aluminum floor slats 52 by welding. To weld wedges 62 to the floor slats 52, it may be necessary to remove the floor slats from the conveyor system to prevent damage to the bearings that support the floor slats that may result from the heat generated during the welding procedure. The use of mechanical fasteners 80 for attaching wedges 68 to the floor slats 52 may be preferred in cargo containers that are used to transport a variety of materials. Mechanical fasteners 80 facilitate the removal of wedges 68 when the wedges are not needed or would hinder use of the floor conveyor.

Floor conveyors 11 are reversed to load some materials such as baled agricultural products. The wedges 68 would clearly interfere with the conveying of bales into a cargo container 10 with the floor slat drive modified to change the direction material is conveyed. Mechanical fasteners 80 facilitate the removal of wedges 68 as well as their reattachment when they are again required. Wedges 68 can also be removed by grinding them off with a grinder.

Figure 5:
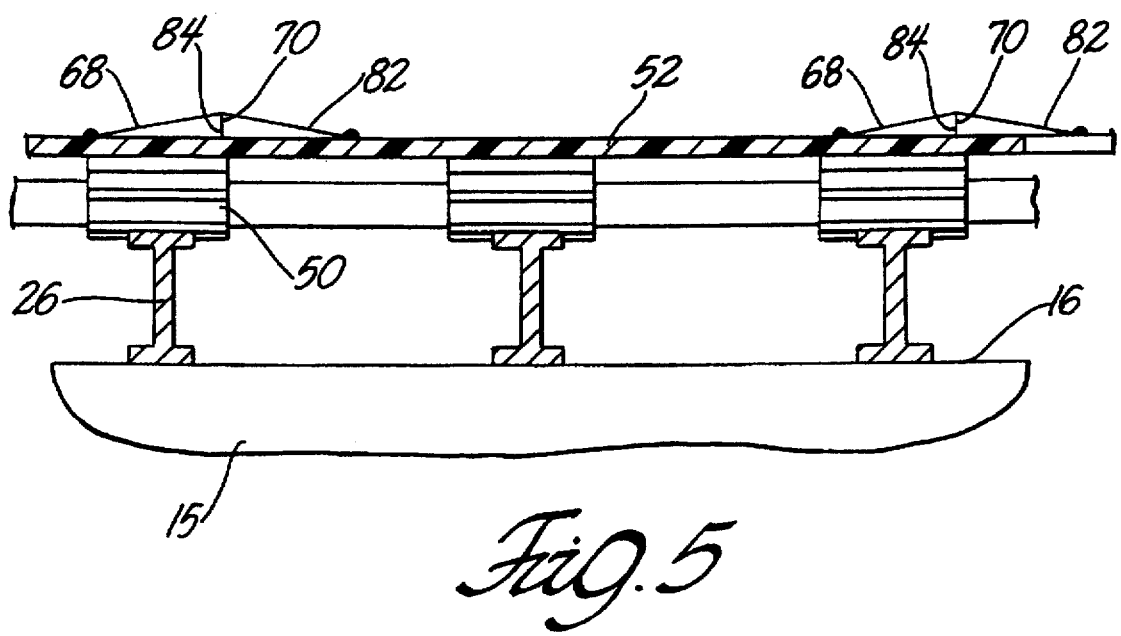
FIG. 5 is a side elevational view of a conveying wedge attached to a floor slat and a neutralizing wedge that neutralizes the conveying action of the conveying wedge.

The conveying action of a wedge 68 on a floor slat 52 may be neutralized by adding a second neutralizing wedge 82 as shown in FIG. 5, with its vertical pushing surface 84 in contact with pushing surface 70 of a wedge 68. The neutralizing wedge 82 can be attached by a mechanical fastening system that permits rapid removal and reattachment.

The disclosed embodiments are representative of presently preferred forms of the invention, but are intended to be illustrative rather than definitive thereof. The invention is defined in the claims.

I claim:

1. A reciprocating floor conveyor mounted in a vehicle cargo container comprising a frame, a pair of side walls mounted on the frame, an end wall mounted on the frame and a discharge opening on an end of the frame opposite the end wall;

a plurality of elongated floor slats, each having an upper surface, mounted on the frame for sliding movement parallel to each other and divided in to a plurality of floor slat groups;

a plurality of drive assemblies mounted on the frame each of which is connected to one of the plurality of floor slat groups; and a plurality of wedges connected to the upper surfaces of at least some of the elongated floor slats each of which has a generally vertical transverse material pushing surface having a height and a width and wherein the generally vertical transverse pushing surface faces the discharge opening, the width of the generally vertical transverse pushing surface is not substantially larger than 80% of the width of the elongated floor slat to which the wedge is attached and an upwardly facing inclined surface having a length that is not substantially less than three times the height of the generally vertical transverse material pushing surface.

2. A reciprocating floor conveyor as set forth in claim 1 wherein the plurality of wedges are attached to an upper surface of the floor slats by mechanical fasteners.

3. A reciprocating floor conveyor as set forth in claim 1 wherein the plurality of wedges are attached to the upper surface of the floor slats by welding.

4. A reciprocating floor conveyor as set forth in claim 1 wherein the plurality of wedges are attached to the upper surface of the floor slats by an adhesive.

5. A reciprocating floor conveyor as set forth in claim 1 including neutralizing wedges mounted on the upper surface of at least some of the plurality of elongated floor slats adjacent to each of the plurality of wedges that blocks contact between material to be conveyed and the generally vertical transverse material pushing surface of said plurality of wedges.

6. A reciprocating floor conveyor as set forth in claim 5 wherein the plurality of neutralizing wedges are removable from the floor slats.

7. A reciprocating floor conveyor mounted in a vehicle cargo container comprising a frame;

a pair of side walls mounted on the frame;

an end wall mounted on the frame and a discharge opening on an end of the frame opposite the end wall;

a plurality of elongated floor slats, each having an upper surface mounted on the frame for sliding movement parallel to each other and divided into a plurality of floor slat groups;

a plurality of drive assemblies mounted on the frame each of which is connected to one of the plurality of floor slat groups; and a plurality of wedges connected to the upper surface of at least some of the elongated floor slats each of which has a generally vertical transverse material pushing surface having a height and width and wherein the generally vertical transverse pushing surface faces the discharge opening, the width of the generally vertical transverse material pushing surface is not substantial less than 20% of the width of the elongated floor slat to which the wedge is attached and an upwardly facing inclined surface having a length that is not substantially more than 6 times the height of the generally vertical transverse material pushing surface.

8. A reciprocating floor conveyor as set forth in claim 7 wherein the plurality of wedges are attached to the upper surface of the floor slats by mechanical fasteners.

9. A reciprocating floor conveyor as set forth in claim 7 wherein the plurality of wedges are attached to the upper surface of the floor slats by welding.

10. A reciprocating floor conveyor as set forth in claim 7 wherein the plurality of wedges are attached to the upper surface of the floor slats by an adhesive.

11. A reciprocating floor conveyor as set forth in claim 7 including a plurality of neutralizing wedges on the upper surfaces of at least some of the plurality of elongated floor slats adjacent to each of the plurality of wedges that block contact between material to be conveyed and the generally vertical transverse material pushing surface of each of said plurality of wedges.

12. A reciprocating floor conveyor as set forth in claim 11 wherein the plurality of neutralizing wedges are removable from the floor slats.

13. A reciprocating floor conveyor mounted in a vehicle cargo container comprising a frame;

a pair of side walls mounted on the frame;

an end wall mounted on the frame and a discharge opening on an end of the frame opposite the end wall;

a plurality of elongated floor slats, each having an upper surface mounted on the frame for sliding movement parallel to each other and divided into a plurality of floor slat groups;

a plurality of drive assemblies mounted on the frame each of which is connected to one of the plurality of floor slat groups; and a plurality of wedges connected to the upper surface of at least some of the elongated floor slats each of which has a generally vertical transverse material pushing surface having a height and a width and wherein the generally vertical transverse pushing surface faces the discharge opening, the width of the generally vertical transverse material pushing surface is about 30% of the width of the elongated floor slat to which the wedge is attached and an upwardly facing incline surface having a length that is about 4 times the height of the generally transverse material pushing surface.

14. A reciprocating floor conveyor as set forth in claim 13 where the plurality of wedges are attached to the upper surface of the floor slats by mechanical fasteners.

15. A reciprocating floor conveyor as set forth in claim 13 wherein the plurality of wedges are attached to the upper surface of the floor slats by welding.

16. A reciprocating floor conveyor as set forth in claim 13 wherein the plurality of wedges are attached to the upper surface of the floor slats by an adhesive.

17. A reciprocating floor conveyor as set forth in claim 13 including neutralizing wedges mounted on the upper surface of at least some of the plurality of elongated floor slats adjacent to each of the plurality of wedges that blocks contact between material to be conveyed and the generally vertical transverse material pushing surfaces of each of said plurality of wedges.

18. A reciprocating floor conveyor as set forth in claim 17 wherein the plurality of neutralizing wedges are removable from the floor slats.

* * * * *